US006927524B2

(12) United States Patent
Pyntikov et al.

(10) Patent No.: US 6,927,524 B2
(45) Date of Patent: Aug. 9, 2005

(54) ROTARY ELECTRIC MOTOR HAVING SEPARATE CONTROL MODULES FOR RESPECTIVE STATOR ELECTROMAGNETS

(75) Inventors: Alexander V. Pyntikov, Ashburn, VA (US); Boris A. Maslov, Reston, VA (US); Mark A. Benson, Leesburg, VA (US); Alexander A. Gladkov, Fairfax, VA (US); Zareh Soghomonian, Reston, VA (US)

(73) Assignee: Wavecrest Laboratories, LLC, Dulles, VA (US)

( * ) Notice: Subject to any disclaimer, the term of this patent is extended or adjusted under 35 U.S.C. 154(b) by 217 days.

(21) Appl. No.: 09/993,596

(22) Filed: Nov. 27, 2001

(65) Prior Publication Data

US 2003/0193264 A1 Oct. 16, 2003

(51) Int. Cl.[7] .................................................. H02K 1/12
(52) U.S. Cl. ..................... 310/254; 310/258; 310/216; 310/259; 318/293; 318/254
(58) Field of Search ........................... 310/254, 156.05, 310/216, 258–259, 266, 156.35; 318/254, 293, 138, 294, 439, 139

(56) References Cited

U.S. PATENT DOCUMENTS

| | | | |
|---|---|---|---|
| 3,344,325 A | 9/1967 | Sklaroff ...................... 318/138 |
| 4,754,207 A | 6/1988 | Heidelberg et al. ......... 318/254 |
| 4,786,834 A | 11/1988 | Grant et al. ................. 310/494 |
| 4,864,176 A | 9/1989 | Miller et al. ................ 310/494 |
| 5,034,675 A | 7/1991 | Nerowski et al. ........... 318/811 |
| 5,164,623 A | 11/1992 | Shkondin ................. 310/67 R |
| 5,179,307 A | 1/1993 | Porter ....................... 310/68 B |
| 5,216,339 A | * 6/1993 | Skybyk ....................... 318/254 |
| 5,258,697 A | * 11/1993 | Ford et al. .................. 318/498 |
| 5,365,137 A | 11/1994 | Richardson et al. ........ 310/288 |
| 5,381,064 A | * 1/1995 | Bennet et al. ............. 310/49 R |
| 5,442,250 A | 8/1995 | Stridsberg ................... 310/186 |
| 5,458,159 A | * 10/1995 | Kilmer ....................... 140/122 |
| 5,481,143 A | 1/1996 | Burdick .................... 310/68 B |
| 5,486,727 A | * 1/1996 | Heidelberg et al. ........... 310/12 |
| 5,661,379 A | * 8/1997 | Johnson ...................... 318/139 |
| 5,808,448 A | * 9/1998 | Naito .......................... 322/13 |
| 6,586,857 B2 | * 7/2003 | Hsu ....................... 310/156.05 |

FOREIGN PATENT DOCUMENTS

| | | |
|---|---|---|
| DE | 195 03 492 A1 | 8/1998 |
| DE | 197 04 576 A1 | 8/1998 |
| EP | 0 006 669 A1 | 1/1980 |
| EP | 0 866 547 A1 | 9/1998 |
| WO | WO 90/11641 | 10/1990 |

* cited by examiner

Primary Examiner—Karl Tamai
Assistant Examiner—Leda Pham
(74) Attorney, Agent, or Firm—McDermott Will & Emery LLP

(57) ABSTRACT

A rotary brushless electric motor is formed within a cylindrical rotor housing structure that surrounds an annular stator ring. The stator is formed of a plurality of individual power modules and corresponding core segments, each module including electrical control and drive elements supplied by a power source incorporated within the stator. Such parallel architecture provides relatively independently controlled functionality for each module. Each module and stator core segment can be individually installed and removed without disturbing the other units. Should a particular module or stator core segment fail, it can be easily removed for repair or replacement and reinstallation.

51 Claims, 8 Drawing Sheets

ROTARY ELECTRIC MOTOR HAVING SEPARATE CONTROL MODULES FOR RESPECTIVE STATOR ELECTROMAGNETS

RELATED APPLICATIONS

This application contains subject matter related to copending U.S. application Ser. No. 09/826,423 of Maslov et al., filed Apr. 5, 2001, copending U.S. application Ser. No. 09/826,422 of Maslov et al., filed Apr. 5, 2001, and U.S. application Ser. No. 09/966,102, filed Oct. 1, 2001. These applications are commonly assigned with the present application. The disclosures of these copending applications are incorporated by reference herein.

FIELD OF THE INVENTION

The present invention relates to rotary electric motors, more particularly to motors wherein the stator is formed of individual modules, each module comprising core and winding structure, electrical control and drive elements, and a power supply integrated therein.

BACKGROUND

The progressive improvement of electronic systems, such as microcontroller and microprocessor based applications for the control of motors, as well as the availability of improved portable power sources, has made the development of efficient electric motor drives for vehicles, as a viable alternative to internal combustion engines, a compelling challenge. Electronically controlled pulsed energization of windings of motors offers the prospect of more flexible management of motor characteristics. By control of pulse width, duty cycle, and switched application of a battery source to appropriate stator windings, functional versatility that is virtually indistinguishable from alternating current synchronous motor operation can be achieved. The use of permanent magnets in conjunction with such windings is advantageous in limiting current consumption.

The above-identified copending related U.S. patent application Ser. No. 09/826,422 of Maslov et al. identifies and addresses the need for an improved motor amenable to simplified manufacture and capable of efficient flexible operating characteristics. In a vehicle drive environment, it is highly desirable to attain smooth operation over a wide speed range, while maintaining a high torque output capability at minimum power consumption. Such a vehicle motor drive should advantageously provide ready accessibility to the various structural components for replacement of parts at a minimum of inconvenience. The copending related U.S. application incorporates electromagnet poles as isolated magnetically permeable structures configured in an annular ring, relatively thin in the radial direction, to provide advantageous effects. With this arrangement, flux can be concentrated, with virtually no loss or deleterious transformer interference effects in the electromagnet cores, as compared with prior art embodiments. While improvements in torque characteristics and efficiency are attainable with the structure of the identified copending application, further improvements remain desirable.

To this end, the above-identified copending related U.S. patent application Ser. No. 09/826,423 of Maslov et al. seeks to optimize rotor parameters such as the grade of the magnet, the energy density and the overall magnetic characteristics of the magnet grade, the size and the dimensions of the magnet that can adjust the permanence and the overall operating condition of the magnet when it is part of the rotor, the temperature stability of the magnet, the finishing, coating and post processing steps taken in manufacturing of the magnets for the intended application, the stability of the magnetization over the curvilinear surface of the magnet, uniformity of the radial polarization of the magnet, the adjacent gap between two separate magnets, the mechanical features of the edges of the magnets, and the return flux path of the magnet as provided by a back iron ring section.

In environments in which portability and size are important factors, the need exists for drive motors that are capable of a wide range of operating characteristics, without sacrificing complex control functionality. Brushless motor systems should have the capability to control each of a plurality of electronic switches to provide accurate commutation sequencing and appropriate application of power to the individual stator windings. The above-identified copending related U.S. patent application Ser. No. 09/966,102 of Maslov et al. describes a motor structural configuration in which the control elements, which can be complex and diverse, are contained within the confines of the stator. The stator flux producing structure, streamlined to a relatively thin annular configuration to accommodate placement of the elements therein, nevertheless is capable of producing appropriate flux output while providing high torque at low operating speeds.

Various advantages attributable to the provision of multiple separate stator magnetic paths in comparison to a single common path in the stator body have been described above. Easy accessibility to the interior of the stator and the structural and electrical components therein present additional opportunities for improved operation.

DISCLOSURE OF THE INVENTION

The present invention fulfills the above described needs, while providing additional benefits of the isolated individual pole pair arrangements disclosed in the identified Maslov et al. applications. The stator is formed of a plurality of individual power modules and corresponding core segments, each module comprising electrical control and drive elements supplied by a power source incorporated within the stator. Such parallel architecture provides relatively independently controlled functionality for each module. Performance of each module individually may be measured in situ during normal operation or by running more extensive, software controlled, diagnostic routines. Based on test results, a module can be automatically recalibrated, disconnected, or flagged for repair or replacement. Overall motor performance, determined by combining the characteristics of the independent modules, can be compared to original benchmarks to analyze various repair options for devising the minimum necessary action.

Each module and stator core segment can be individually installed and removed without disturbing the other units. Should a particular module or stator core segment fail, it can be deactivated without significantly affecting the overall performance of the remaining stator modules. Thereafter, the faulty element can be easily removed and tested externally while permitting the motor to operate with the remaining modules. The faulty component can then be identified and repaired or replaced. At a convenient time, the repaired or replacement unit can be easily reinstalled in its stator compartment.

The thin annular ring configuration of the stator electromagnet core elements provides sufficient space to allocate a substantial portion, if not all, of a relatively complex electrical control system within the confines of the stator structure. Integration of the electrical control components within a shielded space internal to the stator flux producing structure provides several advantages. Simplification of integration is obtained while avoiding electromagnetic interference between the motor and outside environment as well as between the control circuit and the switched stator windings. When used, for example, in specific applications such as vehicle drives, the incorporation of both motor structure and the electrical control system within the vehicle wheel can provide a decrease in weight of the unit, while also decreasing acoustic and mechanical noise. Operation from the user's perspective can be simplified to simulate, for example, conventional automobile operation.

The aforementioned advantages are manifested in structural features of the invention, at least in part, wherein the motor comprises a rotor and stator each disposed in an angular ring configuration and spaced from each other by an annular air gap. The stator comprises a plurality of magnetically permeable core segments with coils wound thereon, the core segments being separated from direct contact with each other and disposed along the radial air gap. The segments thus are individual electromagnets. The inner radial periphery of the stator defines a space within which substantially no flux traverses. A plurality of separate modules are contained within the stator space, each of the modules corresponding to a respective stator electromagnet for providing energization current thereto. The motor is enclosed within a shielded housing thereby to avoid external electromagnetic interference.

Each module may contain drive circuitry and electronic switches connected to a power source and a respective electromagnet, the switches being responsive to drive circuitry for directing current pulses from the power source to a winding of the electromagnet. The internal stator space may contain the power source, such as a battery or battery pack. A rotor position sensor, appropriately located in the stator, outputs rotor position signals to the controller. The controller, switch drive circuitry, and switches can all be mounted on a circuit board. Each electromagnet and its respective module thus comprises an independent unit that can be individually operated. The stator units, of course, function in relation to each other for efficient motor operation. With the replication of elements in each unit, a failure of any particular unit will not impede the independent operation of the remaining units.

In an alternative preferred embodiment, a master controller may be provided within the stator confines for coordinating operation of the units. The master controller may comprise a processor that receives rotor position signals from one or more rotor position sensors and, in response, provides timing signals to drive circuitry in each of the plurality of stator modules.

As an advantageous feature of the present invention, each stator module may contain a separate power source, thereby minimizing effects of battery internal resistance. During motor operation, the drive elements control energization of the winding phases such that energization of a plurality, if not all, of the windings overlap at any particular time. Light weight, low voltage batteries are not ideal current sources. The total current drawn from a single power supply incurs a significant voltage drop due to the internal resistance of the supply. Energization current for each winding thereby is limited, particularly when a single supply must concurrently provide driving current for a plurality of windings. In contrast, with provision of a separate energy supply for each module winding, the supply for that winding is unaffected by whether or not other windings are energized as current will be drawn only for the one winding. As an additional advantage, interference among the phases from respective switched phase energization is minimized.

The power supplies of the plurality of modules may each comprise one or more replaceable batteries that are readily accessible to the user. The batteries may be capable of being recharged either internally or from an external source when removed from the stator. Thus, the batteries may be located in areas most accessible to the user, either distributed within their respective units or centrally placed. The batteries also may be recharged regeneratively during motor operation.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTIONS OF DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 1:
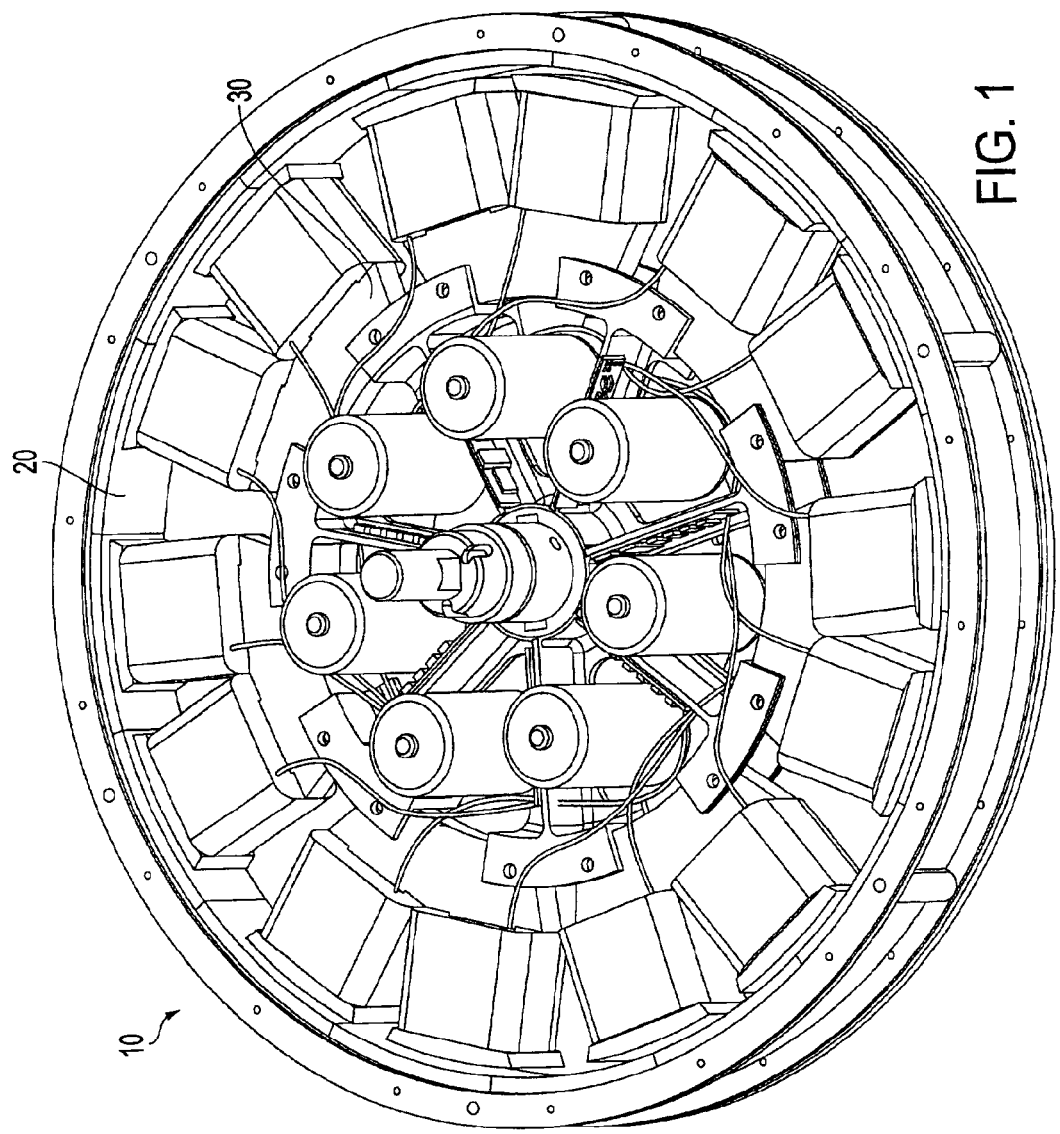
FIG. 1 is a partial three dimensional perspective view of a motor according to the present invention.

The motor of the present invention is suitable for use in driving a vehicle wheel of an automobile, motorcycle, bicycle, or the like. The drawing illustrations thus depict motor structure that can be housed within a vehicle wheel, the stator rigidly mounted to a stationary shaft and surrounded by a rotor for driving the wheel. It should be appreciated, however, that the vehicle context is merely exemplary of a multitude of particular applications in which the motor of the present invention may be employed.

Figure 2:
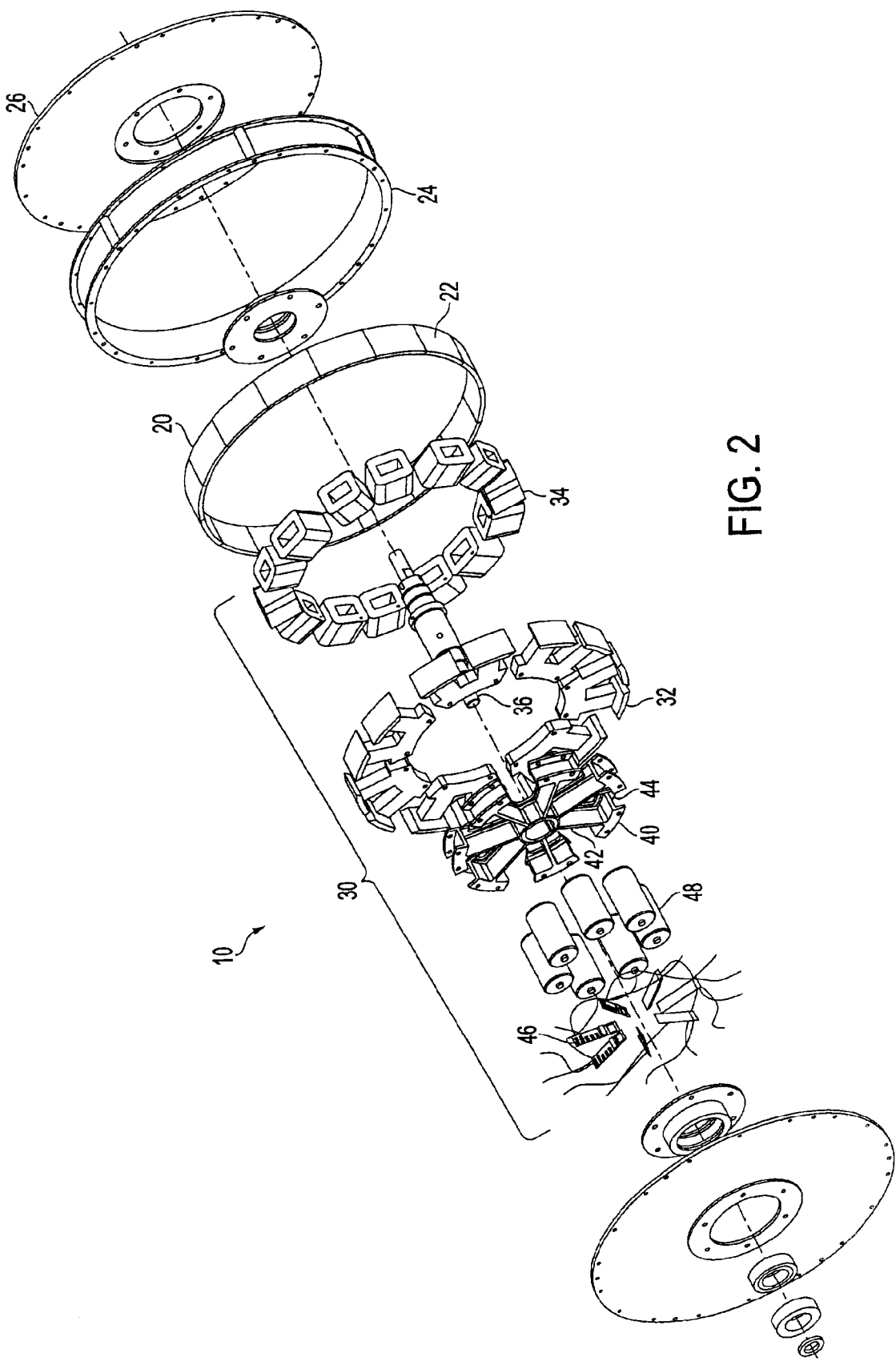
FIG. 2 is an exploded view of the structural components of the motor of FIG. 1 illustrative of the positional relationship among the various elements.

FIG. 1 is a cutaway drawing of the motor structure, the elements shown in more detail in the exploded view of FIG. 2. Motor 10 comprises annular permanent magnet rotor 20 and annular stator structure 30 separated by a radial air gap. The rotor and stator are configured coaxially about an axis of rotation, which is centered in stationary shaft 36. The stator comprises a plurality of ferromagnetically isolated elements, or stator groups. Core segments 32, made of magnetically permeable material separated from direct contact with each other, have respective winding portions 34 formed on each pole. Seven stator groups are shown, each group comprised of two salient electromagnet poles, allocated circumferentially along the air gap. The rotor comprises a plurality of permanent magnets 22, circumferentially distributed about the air gap and affixed to a nonmagnetic annular back plate 24, which may be formed of aluminum or other non magnetically permeable material. The back plate is part of the motor housing to which is attached side walls 26.

The flux distributions produced by the rotor magnets may be enhanced by the provision of a magnetically permeable element, not shown, mounted to the back of the rotor magnets. Sixteen rotor magnets are shown. It is to be understood that the numbers of stator poles and rotor magnets illustrated are merely exemplary, as various ratios can be utilized, depending on desired operational parameters. For example, fewer electromagnets spaced at greater distances may produce different speed characteristics. The stator core segments are secured to a rigid skeletal structure 40 that is centrally fixed to the shaft 36. Spine members 42, equal in number to the number of stator groups, extend radially away from the center of structure 40 to U-shaped plates 44. The U-shaped plate sides and the stator core segments contain mating holes by which the stator segments can be fixed to the skeletal structure. Each U-shaped plate engages an adjacent pair of stator segments.

Each stator segment and adjoining pair of spine members together define a space within which circuit elements are contained. The rigid spine portions 42 have sufficient surface area to provide the necessary structural support as well as to accommodate circuit boards 46. A circuit board may be affixed to each spine portion in any conventional manner. Each circuit board contains the control circuit elements and switches needed for application of energizing current through appropriate wiring connections to a winding of a stator core segment to which the spine portion is attached. It should be appreciated that all control circuit elements and switches can be integrated into a single circuit board to provide even greater economy of space and weight. The motor power supply, represented by batteries 48, is also self-contained within the stator spaces. Appropriate receptacles (not shown) for the batteries can be fixed to the spine portions 42. The receptacles, which may be of any conventional variety, permit easy removal of the batteries for replacement or recharge. While a single battery is shown for each stator module, the illustration is representative of an energy source that may take the form of a battery pack, a plurality of batteries, or any variations of well known voltage sources. That is, any commercially available battery type or battery pack that is of sufficient capacity to supply the necessary motor power may be used. Thus, depending on particular battery characteristics and motor drive requirements, it is possible to use the module spaces for location of other elements.

Figure 3:
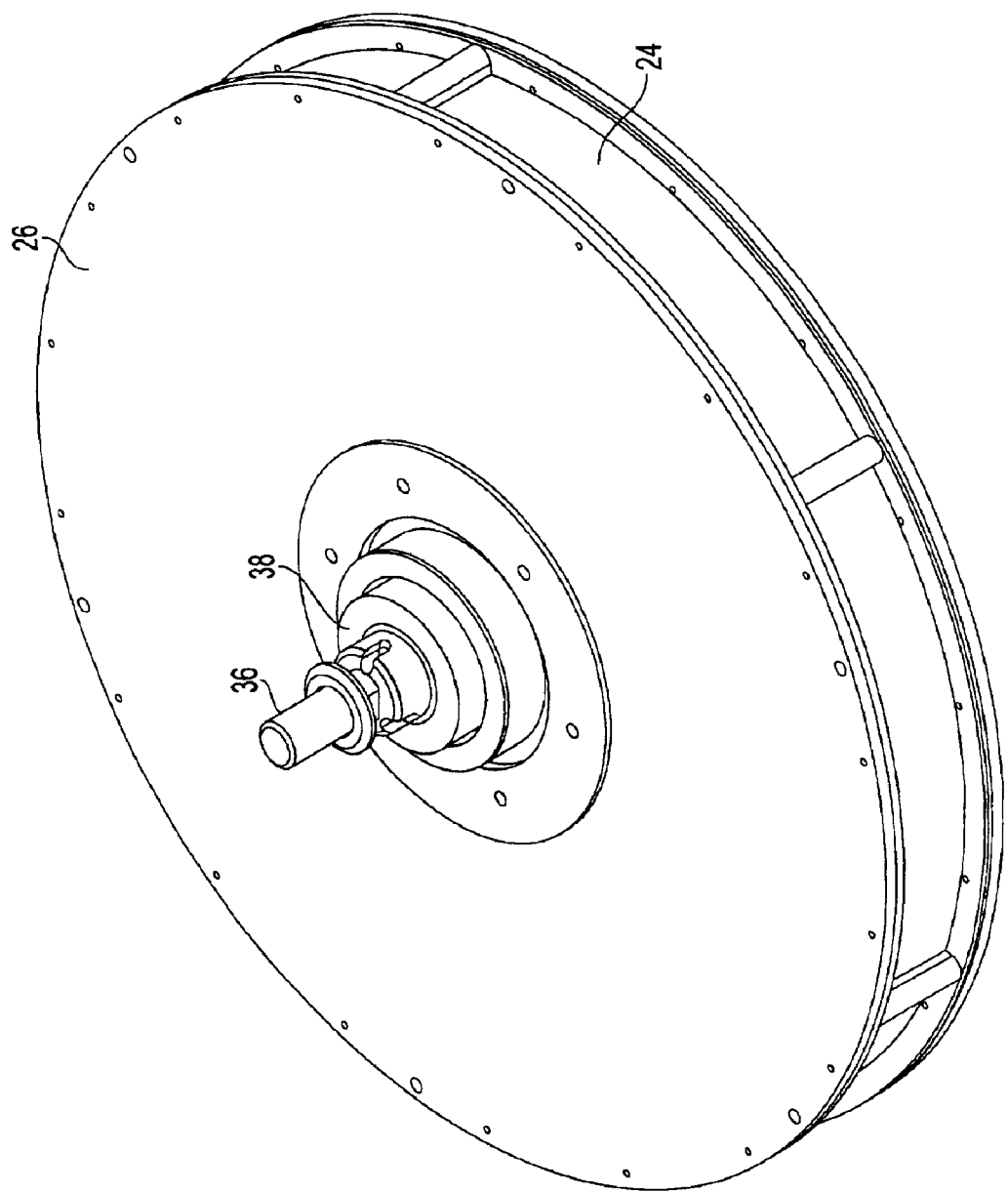
FIG. 3 is a perspective external view of the motor of FIGS. 1 and 2.

FIG. 3 is a three dimensional external view of the motor system of FIGS. 1 and 2. The rotor housing outer ring 24 and side walls 26 are configured to form a wheel hub on which a tire, not shown, can be mounted. The rotor wheel housing is journalled for rotation about the stationary shaft 36 via bearings 38. The cylindrical rotor housing structure surrounds the stator annular ring that is coextensively aligned in the axial direction with the rotor across the air gap.

Figure 4:
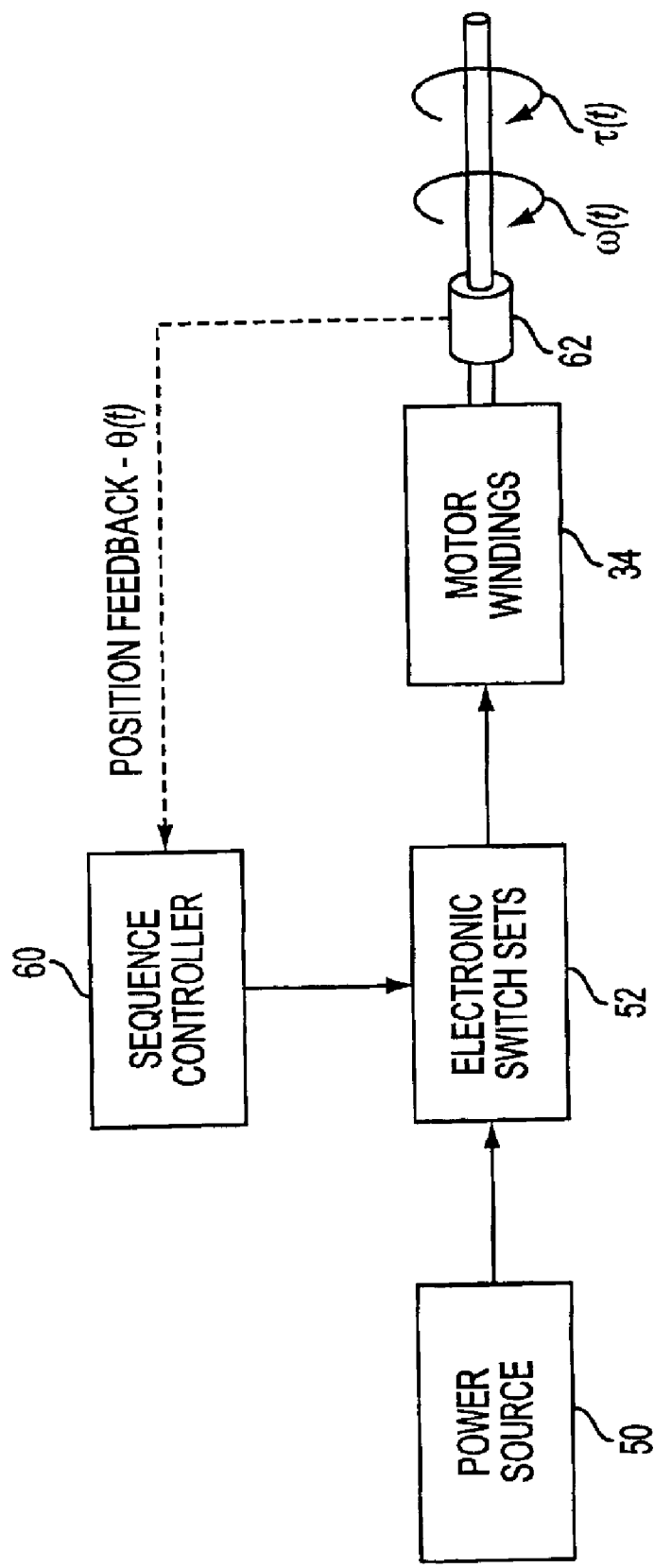
FIG. 4 is a block diagram of a control system suitable for use in the motor of FIGS. 1–3.

FIG. 4 is a block diagram of a typical control system that may be employed to drive the motor structure shown in FIGS. 1–3. Stator windings 34 are switchably energized by driving current supplied from power source 50 via electronic switch sets 52. Timing of the current pulses is subject to the control of sequence controller 60, which is responsive to feedback signals received from position sensor 62. Sequence controller may include a microprocessor or equivalent digital signal processor. Although position sensor 62 is schematically represented by a single unit, several sensors may be appropriately distributed at stator sections along the air gap to detect rotor magnet rotation. The position sensor may comprise any known magnetic sensing devices, such as a Hall effect devices, giant magneto resistive (GMR) sensors, reed switches, pulse wire sensors, amorphous sensors, resolvers or optical sensors.

Figure 5:
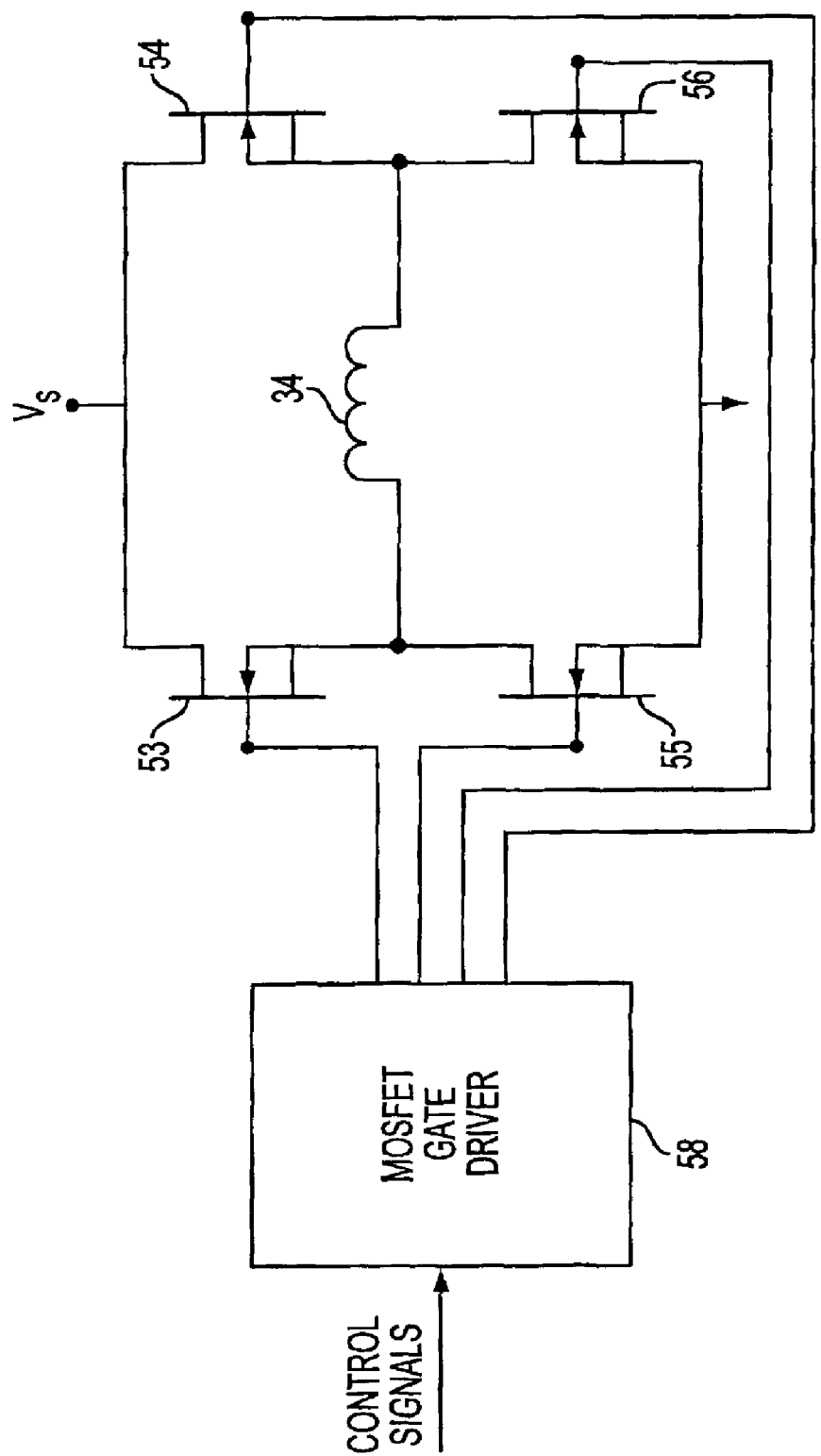
FIG. 5 is a partial block diagram for a winding switching circuit of the system of FIG. 4.

The use of controlled electronic switches for application of energizing current to motor windings is common in the art. FIG. 5 is a partial circuit diagram of a switch set and driver for an individual stator core segment winding. Stator winding 34 is connected in a bridge circuit of four FETs. It is to be understood that any of various known electronic switching elements may be used for directing driving current in the appropriate direction to stator winding 34 such as, for example, bipolar transistors. FET 53 and FET 55 are connected in series across the power source, as are FET 54 and FET 56. Stator winding 34 is connected between the connection nodes of the two series FET circuits. Gate driver 58 is responsive to control signals received from the sequence controller 60 to apply activation signals to the gate terminals of the FETs. FETs 53 and 56 are concurrently activated for motor current flow in one direction. For current flow in the reverse direction, FETs 54 and 55 are concurrently activated. Gate driver 58 may be integrated into sequence controller 60 or comprise a separate driver circuit.

Figure 6:
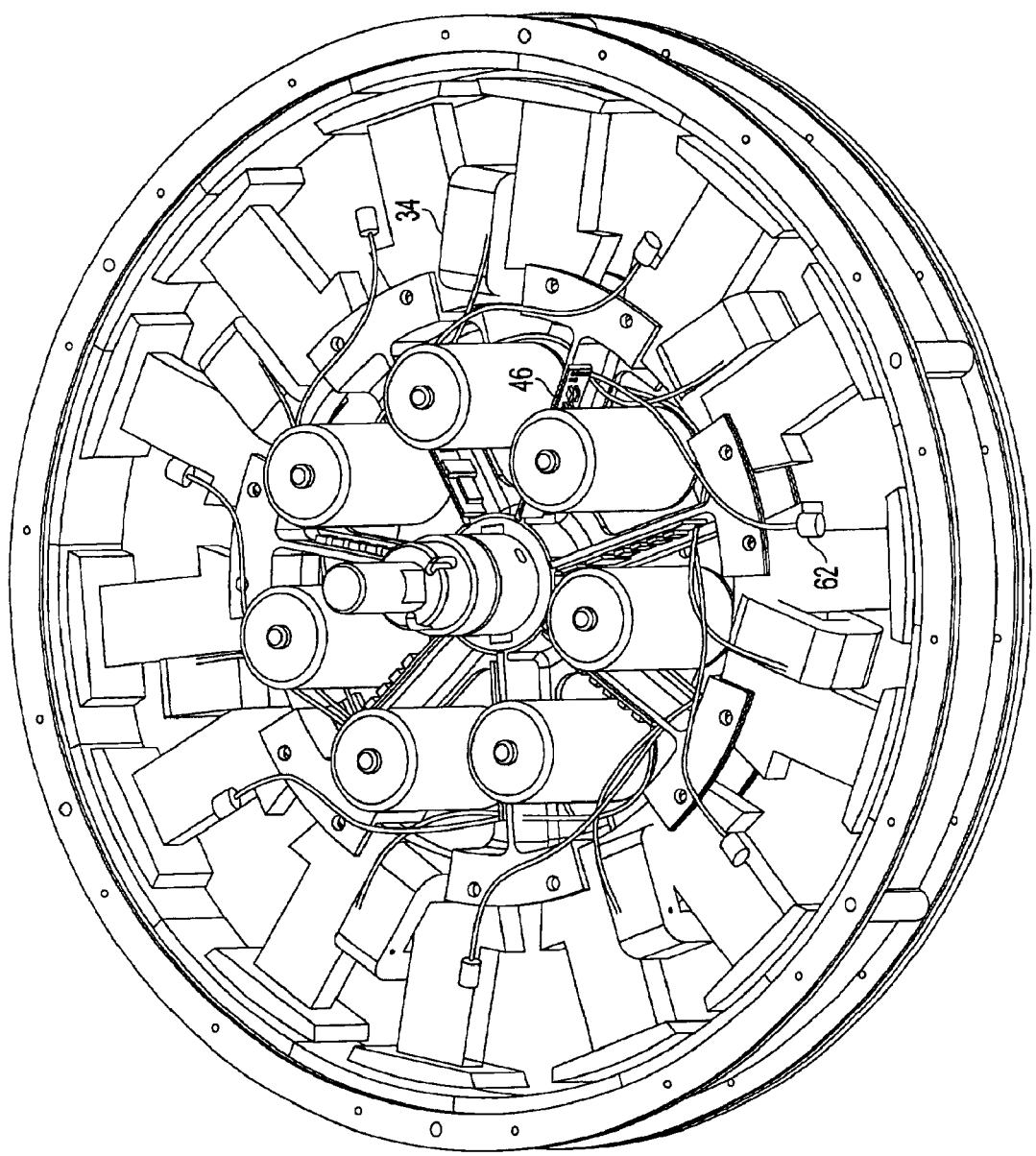
FIG. 6 is a partial three dimensional perspective view of a variation of the motor structural arrangement shown in FIG. 1, in accordance with the present invention.

FIG. 6 is a partial three dimensional perspective view of a variation of the motor structural arrangement shown in FIG. 1. Instead of providing a separate winding portion on each of the electromagnet stator poles, winding 34 of each stator core segment is formed on a core section that links the poles. In proximity to each of the stator cores sections is a position sensor 62, which generates output signals indicative of rotor position relative to the corresponding stator core section. The output signals are applied to control circuitry contained on circuit board 46.

Figure 7A:
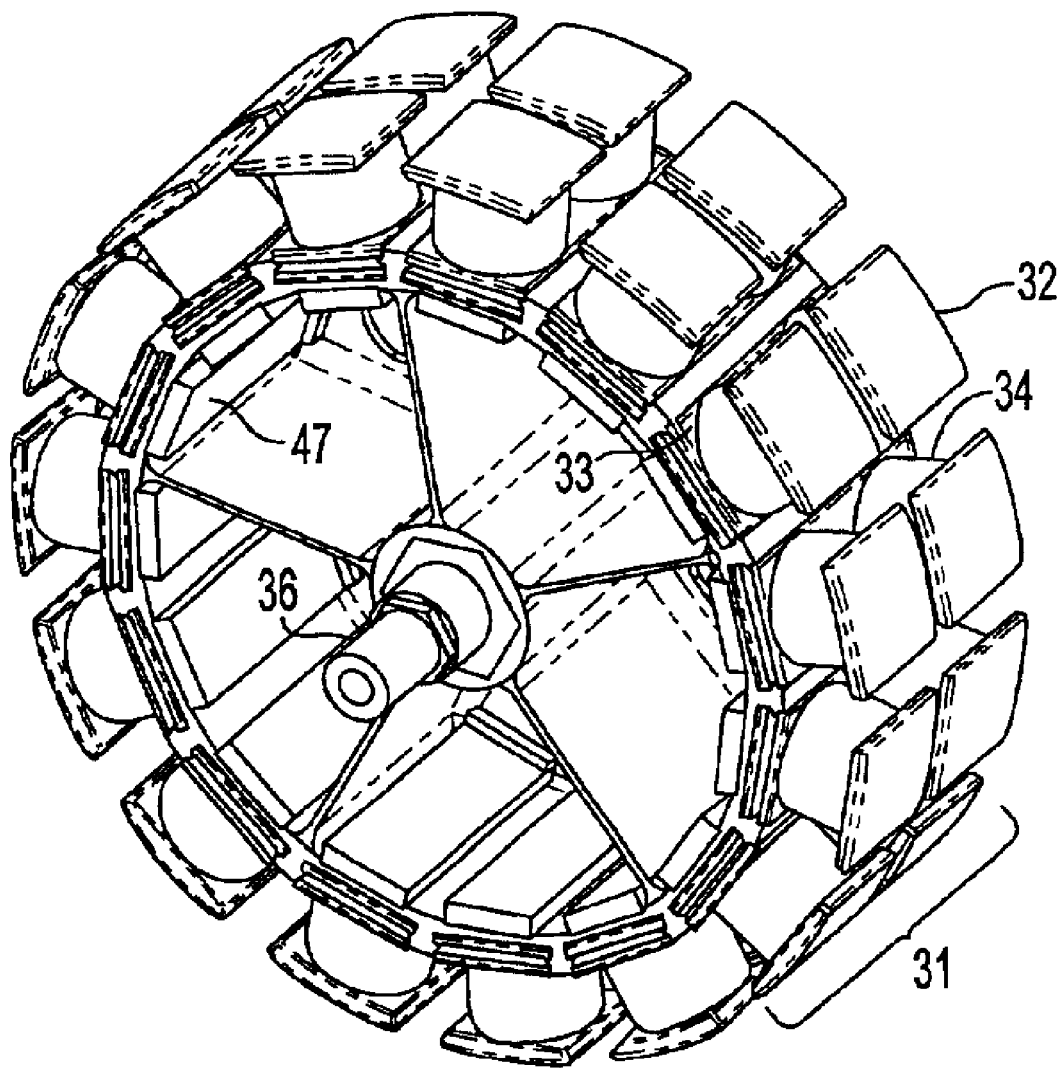
FIGS. 7a–7c are illustrative of an alternative stator construction according to the present invention.
Figure 7C:
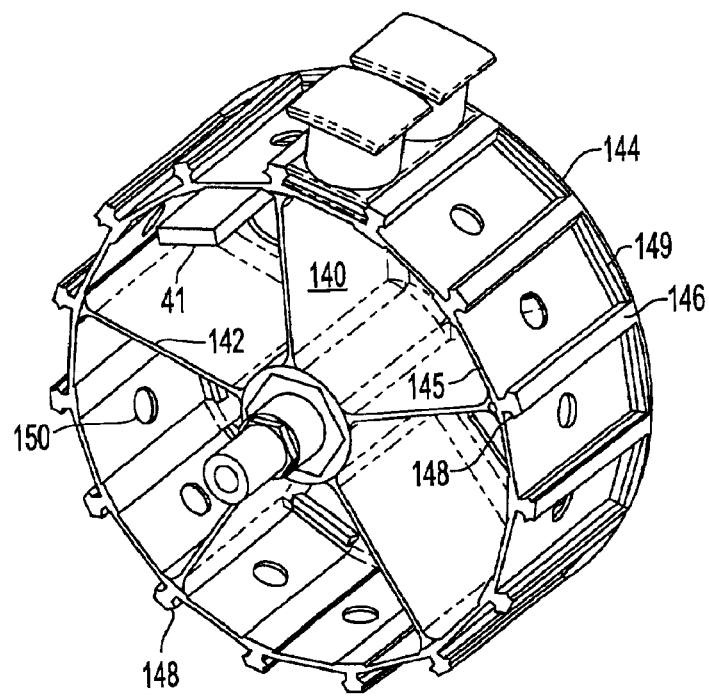
Figure 7B:
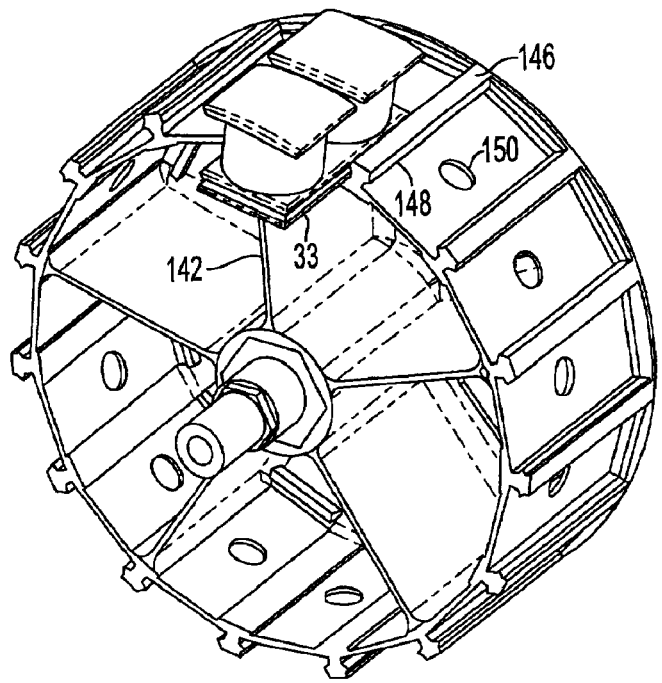

FIGS. 7a–7c are illustrative of an alternative structural arrangement of the stator in accordance with the present invention. A plurality of fifteen core segments 31 are shown, each segment comprising a pair of salient poles 32 and a linking portion 33. The core segments are each constructed of magnetically permeable material. Each segment pole pair is aligned in a direction parallel to the axis of rotation and has a winding 34 formed on each pole. Linking portion 33 is a relatively thin segment joined at its outer peripheral surface to the salient poles 32 while having an inner peripheral surface that is somewhat concave. The degree of concavity is commensurate with the radial spacing of core segments from the axis of rotation so that the core segments are configured generally circumferentially. Linking portion 33 extends in the circumferential direction on either side beyond the salient poles.

The stator core segments are secured to a rigid skeletal structure 140 that is centrally fixed to the shaft 36. Skeletal structure 140 is formed of a non-magnetically permeable material, such as plastic or aluminum. The skeletal structure, which is fixed to shaft 36, comprises spine members 142 integrally formed with a generally circumferential portion 144. As can be seen more clearly in FIGS. 7b and 7c, portion 144 comprises a relatively thin cylindrical sleeve 145 having rib members 146 on its radially outer periphery. The rib members extend outwardly from the sleeve and are generally parallel to the axis of rotation. Each rib member has flanged portions 148 near its outer extent to form grooves with the sleeve 145. Adjacent ribs 146 are joined at one end of the sleeve by an additional ribbed groove portion 149.

Adjacent ribs and adjoining groove portions therebetween form outer slots that accommodate stator linking portions 33. Thus, for the fifteen stator core segments, fifteen slots are provided by the skeletal structure. As can be seen in FIG. 7b, a stator segment may be easily inserted into the skeletal support structure by sliding the core segment linking portion 33 into an outer slot. The stator segment may be easily removed from the support structure by sliding the core segment linking portion 33 out of the outer slot.

The inner radial periphery of sleeve 145 similarly is constructed with ribs to form grooves and inner slots. The inner slots, which accommodate power modules 47, are radially aligned with the outer slots. At a relatively central portion of each paired slot is a cutout 150 in sleeve 145. The power modules contain the control and switch circuitry for controlled energization of stator winding 34 formed on the stator segment in the opposite slot. The cutout permits electrical connection between the power module and the stator winding. As can be seen in FIG. 7c, the power module package conforms to the dimension of the inner slot and can readily be inserted or removed therefrom.

It is to be understood that the number of stator segments shown has been chosen merely for illustration, as any particular number of stator poles may be provided, depending upon desired operating criteria. The distance between spines 142 in the illustrated embodiment spaces three sets of stator core segments and provides space for placement of energy sources and one or a plurality of controllers. The number of spines, of course, can be varied in light of structural considerations.

In this disclosure there is shown and described only preferred embodiments of the invention and but a few examples of its versatility. It is to be understood that the invention is capable of use in various other combinations and environments and is capable of changes or modifications within the scope of the inventive concept as expressed herein. For example, as can be appreciated, the motor of the invention can be utilized in a wide range of applications in addition to vehicle drives. Additionally, while it is preferable to provide a separate energy supply for each module for reasons described above, a single source of sufficient capacity may be used to supply a plurality of stator segment windings.

It is within contemplation that the embodiment of FIGS. 7a–7c is applicable to circumferential alignment of core segment pole pairs, as well as the axial aligned arrangement illustrated. Thus, for example, the stator core sections shown in FIGS. 1 and 6 may comprise linking portions that conform in shape to outer slots of a stator supporting structure, such as shown in FIGS. 7a–7c. Inner slots may be provided for containment of electrical components.

What is claimed is:

1. A rotary electric motor comprising:
a permanent magnet rotor having a plurality of permanent magnets disposed in an annular ring configuration;
a stator comprising a plurality of separate, ferromagnetically isolated electromagnets in an annular ring configuration, windings of the electromagnets selectively energized to form magnetic poles of alternating polarity along a radial air gap that separates the stator from the rotor; and
a plurality of separate power modules, each of said modules corresponding to a respective stator electromagnet for providing energization current thereto; and
wherein the plurality of separate power modules are contained within the stator radially inward of the stator electromagnets.

2. A rotary electric motor as recited in claim 1, wherein the motor is enclosed within a shielded housing thereby to avoid external electromagnetic interference.

3. A rotary electric motor as recited in claim 1, wherein each of said power modules comprises:
drive circuitry; and
electronic switches connected to a power source and the respective electromagnet, the switches being responsive to drive circuitry for directing current pulses from the power source to a winding of the electromagnet.

4. A rotary electric motor as recited in claim 3, wherein each of said power modules further comprises a circuit board having mounted thereon respective drive circuitry and respective switches.

5. A rotary electric motor as recited in claim 4, further comprising a sequence controller connected to the drive circuitry of each module for applying thereto timing signals.

6. A rotary electric motor as recited in claim 5, further comprising at least one rotor position sensor for providing output signals indicative of rotor position and wherein said sequence controller is responsive to said output signals.

7. A rotary electric motor as recited in claim 3, wherein said power source comprises a plurality of batteries contained within the stator, each of said batteries supplying power to only one of said modules.

8. A rotary electric motor as recited in claim 3, wherein each of said power modules further comprises:
a rotor position sensor for providing output signals indicative of rotor position relating to the respective power module; and
a sequence controller connected to the drive circuitry and to said rotor position sensor for providing timing signals for controlling the operation of said switches.

9. A rotary electric motor as recited in claim 8, wherein direction of current flow and duration of each current pulse is determined by selected activation of the switches by the drive circuitry.

10. A rotary electric motor as recited in claim 1, wherein said ferromagnetically isolated electromagnets comprise a plurality of core segments having respective coils wound thereon to form stator windings, said core segments having an outer radial periphery at the air gap and an inner radial periphery defining a volume within which substantially no flux traverses; and
a non-ferromagnetic support structure for containment of said core segments in ferromagnetic isolation from each other and for supporting said plurality of separate power modules, each of said modules corresponding to a respective stator electromagnet for providing winding energization current thereto.

11. A stator as recited in claim 10, wherein said non-ferromagnetic support structure comprises:
a generally circumferential sleeve portion; and
a plurality of spine members each integrally formed at a first end with said sleeve portion and adapted to be fixed to a stationary shaft at a second end, whereby said sleeve is positioned at a fixed radial distance from said shaft and coaxial therewith.

12. A stator as recited in claim 11, wherein said sleeve portion comprises a plurality of generally parallel ribs on an outer surface thereof to form slots; and each of said core segments comprises:
- a pair of salient poles; and
- a linking portion joining the poles, said linking portion configured to mate with one of said slots;
- whereby said core segments are slideably engageable with and slideably removable from said slots.

13. A stator as recited in claim 12, wherein said sleeve portion comprises a plurality of generally parallel ribs on an inner surface thereof to form slots for slideably receiving said power modules.

14. A stator as recited in claim 13, wherein the outer surface ribs are generally in alignment with the inner surface ribs and the sleeve portion between an adjacent set of ribs comprises a cutout for permitting electrical connection between a power module and a stator winding.

15. A rotary electric motor comprising:
- a permanent magnet rotor having a plurality of permanent magnets disposed in an annular ring configuration; and
- a stator coaxial with the rotor and separated therefrom by a radial air gap;
- wherein the stator comprises a plurality of independent stator units, each of the units comprising a ferromagnetically isolated core having a winding formed thereon and a separate power supply therefor.

16. A rotary electric motor comprising:
- a permanent magnet rotor having a plurality of permanent magnets disposed in an annular ring configuration; and
- a stator coaxial with the rotor and separated therefrom by a radial air gap;
- wherein the stator comprises a plurality of independent stator units, each of the units comprising a ferromagnetically isolated core having a winding formed thereon, circuitry for controlling energization of the winding, a rotor position sensor, and a separate power supply therefor.

17. A rotary electric motor as recited in claim 16, wherein the rotor surrounds the stator.

18. A rotary electric motor as recited in claim 17, wherein each of the units is a structurally self-contained component.

19. A rotary electric motor as recited in claim 16, wherein said circuitry comprises:
- electronic switches connected to the power source and the respective electromagnet winding; and
- a switch driver responsive to a controller for applying driving pulses to the switches to apply current pulses from the power supply to a winding of the electromagnet.

20. An electric motor comprising:
- a rotor member comprising a plurality of permanent magnets arranged in an annular ring configuration;
- a stator member comprising a plurality of separate stator core segments arranged in an annular ring configuration, wherein a conductive winding is wound in a coil around a portion of each core segment;
- wherein said stator member and said rotor member are separated from each other by an air gap; and
- wherein at least one circuit board is in electrical communication with the conductive winding of at least one stator core segment, the circuit board located internal to said motor and adjacent to said stator core segment.

21. An electric motor as recited in claim 20, wherein each said at least one circuit board comprises:
- one or more control circuit elements; and
- one or more electronic switches in electrical communication with said one or more control circuit elements.

22. An electric motor as recited in claim 21, wherein each said at least one circuit board is in electrical communication with the conductive winding of only one stator core segment.

23. An electric motor as recited in claim 21, wherein each said circuit board further comprises a sequence controller connected to one or more electronic switches.

24. An electric motor as recited in claim 23, wherein said sequence controller is electrically connected to one or more control circuit elements and a rotor position sensor.

25. An electric motor as recited in claim 21, wherein said one or more control circuit elements and said one or more electronic switches are secured to a common substrate.

26. An electric motor as recited in claim 20, further comprising a motor operation controller that is in electrical communication with said at least one circuit board.

27. An electric motor as recited in claim 26, wherein said motor operation controller further is in electrical communication with a motor operation input device.

28. An electric motor as recited in claim 20, further comprising at least one rotor position sensor.

29. An electric motor as recited in claim 20, further comprising at least one power source.

30. An electric motor as recited in claim 29, wherein said power source comprises at least one rechargeable battery.

31. An electric motor as recited in claim 30, wherein said at least one rechargeable battery is electrically coupled to at least one circuit board.

32. An electric motor as recited in claim 29, wherein said at least one power source is in electrical communication with the conductive winding of only one stator core segment.

33. An electric motor as recited in claim 29, wherein said power source is located adjacent to said stator core segments.

34. An electric motor as recited in claim 29, wherein said at least one power source is located external to said motor.

35. An electric motor as recited in claim 29, wherein the direction of current flow and duration of each current pulse from a power source to said conductive winding is controlled by said at least one circuit board.

36. An electric motor as recited in claim 20, wherein each said stator core segment comprises two or more salient poles with a common conductive winding.

37. An electric motor as recited in claim 20, wherein said plurality of core segments comprise an outer radial periphery at the air gap and an inner radial periphery defining a volume.

38. The motor as recited in claim 20, wherein said stator core segments are secured to a support structure.

39. An electric motor as recited in claim 38, wherein said support structure is formed from a non-ferromagnetic material.

40. An electric motor as recited in claim 38, wherein at least one control board is secured to said support structure.

41. An electric i motor as recited in claim 38, wherein at least one power source is secured to said support structure.

42. The motor as recited in 38, wherein said support structure comprises:
- a generally circumferential sleeve portion; and
- a plurality of radial members extending outwardly in a radial direction from said sleeve portion, wherein each radial member is integrally formed at a first end with said sleeve portion and not supported at a second end.

43. An electric motor as recited in claim 38, wherein said support structure comprises a central aperture.

44. An electric motor as recited in claim 43, wherein a shaft is located in said central aperture.

45. An electric motor as recited in claim 44, wherein said support structure is secured to said shaft.

46. An electric motor as recited in claim 45, wherein said linking portion is secured to a support structure.

47. An electric motor as recited in claim 20, wherein said stator core segments are ferromagnetically isolated from each other.

48. The motor as recited in claim 45, wherein said stator core segments comprise a linking portion joining two poles.

49. An electric motor as recited in claim 20, wherein the motor is shielded from external electromagnetic interference.

50. An electric motor as recited in claim 20, wherein said at least one circuit board is electrically connected to at least one power source and the conductive winding of only one of said stator core segments.

51. The motor as recited in claim 20, wherein the rotor surrounds the stator.

* * * * *